United States Patent
Yeh et al.

(10) Patent No.: US 6,518,560 B1
(45) Date of Patent: Feb. 11, 2003

(54) AUTOMATIC GAIN AMPLIFIER FOR BIOMETRIC SENSOR DEVICE

(75) Inventors: Hsueh-Li J. Yeh, Cupertino, CA (US); Ericson W. Cheng, Santa Clara, CA (US); Anthony P. Russo, New York, NY (US)

(73) Assignee: Veridicom, Inc., Sunnyvale, CA (US)

( * ) Notice: Subject to any disclaimer, the term of this patent is extended or adjusted under 35 U.S.C. 154(b) by 0 days.

(21) Appl. No.: 09/560,702

(22) Filed: Apr. 27, 2000

(51) Int. Cl.[7] .............................................. H01L 31/00
(52) U.S. Cl. ................. 250/214 AG; 382/115
(58) Field of Search .................. 250/214 AG, 214 LA, 250/214 LS, 214.1, 214 R, 214 P, 208.1; 382/313, 214, 115

(56) References Cited

U.S. PATENT DOCUMENTS

| | | | |
|---|---|---|---|
| 3,781,855 A | 12/1973 | Killen ................. | 340/146.3 E |
| 4,151,512 A | 4/1979 | Riganati et al. ...... | 340/146.3 E |
| 4,290,052 A | 9/1981 | Eichelberger et al. .. | 340/365 C |
| 4,353,056 A | 10/1982 | Tsikos ................. | 340/146.3 E |
| 4,543,564 A | 9/1985 | Audoin et al. .......... | 340/365 C |
| 4,673,807 A * | 6/1987 | Kobayashi et al. ......... | 250/214 |
| 4,701,603 A * | 10/1987 | Dakin et al. ................. | 250/201 |
| 4,876,726 A | 10/1989 | Capello et al. ................ | 382/4 |
| 4,991,127 A | 2/1991 | Crookshanks .......... | 364/571.04 |
| 5,325,442 A | 6/1994 | Knapp ........................... | 382/4 |
| 5,495,077 A | 2/1996 | Miller et al. .................... | 178/18 |
| 5,581,630 A | 12/1996 | Bonneau, Jr. ............... | 382/116 |
| 5,586,042 A | 12/1996 | Pisau et al. .................. | 364/482 |
| 5,598,474 A | 1/1997 | Johnson ......................... | 380/23 |
| 5,613,012 A | 3/1997 | Hoffman et al. ............. | 382/115 |
| 5,689,576 A * | 11/1997 | Schneider et al. ........... | 382/124 |
| 5,778,089 A | 7/1998 | Borza .......................... | 382/124 |
| 5,818,973 A | 10/1998 | Hsu ............................. | 382/260 |
| 5,838,463 A | 11/1998 | Gahang ....................... | 358/465 |
| 5,862,248 A | 1/1999 | Salatino et al. ............. | 382/124 |
| 5,987,156 A * | 11/1999 | Ackland et al. ............. | 382/125 |
| 6,259,804 B1 * | 7/2001 | Setlak et al. ................. | 382/124 |
| 6,330,345 B1 * | 12/2001 | Russo et al. ................. | 382/115 |

FOREIGN PATENT DOCUMENTS

| | | | |
|---|---|---|---|
| EP | 0 507 319 A2 | 10/1992 | ............ G06K/9/46 |
| EP | 0 791 899 A2 | 8/1997 | ............ G07C/9/00 |
| EP | 0 813 338 A2 | 12/1997 | |
| JP | 08305832 | 11/1996 | ............ G06T/1/00 |
| WO | WO 98/52146 A | 11/1998 | |

OTHER PUBLICATIONS

Anderson et al., *A Single Chip Sensor & Image Processor for Fingerprint Verification*, IEEE Custom Integrated Circuits Conference, pp. 12.1.1–12.1.4, 1991.

Inglis et al., *SA 17.7:A Robust, 1.8V 250μW Direct–Contact 500dpi Fingerprint Sensor*, IEEE International Solid–State Circuits Conference, pp. 284–285, 1998.

Young et al., *Novel Fingerprint Scanning Arrays Using Polysilicon TFT's on Glass and Polymer Substrates*, IEEE Electron Device Letters, vol. 18, No. 1, pp. 19–20, Jan. 1997.

Kim et al., *Automatic Fingerprint Verification System Digital Image Processing Algorithm*, Proceedings IEEE Conference, 1987, IEEE Region 10 Conference, pp. 3.2.1–3.2.5.

*Exclusive Use Agreement*, NEC Research and Development, JP, Nippon Electric LTD. Tokyo, No. 96, Mar. 1990, pp. 143–159.

\* cited by examiner

Primary Examiner—Robert H. Kim
Assistant Examiner—Hoon K. Song

(57) ABSTRACT

An automatic gain amplifier is disclosed that dynamically improves the quality of scanned biometric information. According to one embodiment, an image distribution of the scanned biometric is generated. Next, areas of higher image distribution are identified. An iterative process of adjusting the gain of, for instance, a capacitive sensing, is employed until an optimum separation of the areas of higher image distribution is achieved. Once the optimum separation is achieved, the gain is applied to the biometric sensing device so that biometric information can be scanned with improved image clarity. Electronic circuitry and software for implementing the methods are disclosed.

21 Claims, 5 Drawing Sheets

AUTOMATIC GAIN AMPLIFIER FOR BIOMETRIC SENSOR DEVICE

BACKGROUND

1. Field of the Invention

The present invention is related to an automatic gain amplifier, and more particularly to an automatic gain amplifier used in a biometric sensing device.

2. Background Information

In biometric imaging devices, for example optical-based or electrical properties-based fingerprint scanning devices, a user places a finger on a fingerprint sensor. The fingerprint sensor scans the fingerprint and generates an analog or digital signal that is representative of the scanned fingerprint. According to at least one imaging technique, a grayscale image is produced of the scanned fingerprint. Each pixel of the grayscale image has a value between 0 and 255—a value of 0 value representing a "black" pixel and a value of 255 representing a white pixel. Based on this grayscale image, biometric information is extracted.

FIG. 1 shows a diagram of a known fingerprint imaging device 2. In normal operation, the fingerprint imaging device uses techniques derived from Coulombs law to determine the location of ridges and valleys in a fingerprint surface. By modeling each sensing element on the sensor as one plate in a capacitor and the finger surface (that is, the ridges and valleys) as the second plate in the capacitor, it is possible to measure a relative distance between the ridges and valleys to construct the fingerprint.

As is shown in FIG. 2, the fingerprint imaging device 2 is typically embodied in biometric sensor chip 4, which consists of an m by n array of sensing elements or capacitive plates 6.

A drawback to known biometric sensing devices, and in particular the imaging techniques employed, is that from individual to individual, and indeed, from situation to situation, the characteristics of the biometric, that is, the finger, can vary greatly. For instance, the moisture content of the finger may vary, as can the relative distance between ridges and valleys. Because these parameters vary, the resultant biometric image may not have the requisite image clarity needed when the biometric sensing device is deployed in a highly sensitive environment.

SUMMARY OF THE INVENTION

An automatic gain amplifier is disclosed that dynamically improves the quality of scanned biometric information. According to one embodiment, an image distribution of the scanned biometric is generated. Next, areas of higher image distribution are identified. An iterative process of adjusting the gain of a biometric sensor device, for instance, a capacitive sensing element, is employed until an optimum separation of the areas of higher image distribution is achieved. Once the optimum separation is achieved, the biometric sensing device analyzes the resulting image so that biometric information can be detected with improved image clarity and less interference with noise, such as dust and changing biometric parameters. Electronic circuitry and software for implementing the methods and apparatuses of the invention are disclosed.

DETAILED DESCRIPTION OF THE PREFERRED EMBODIMENTS

Figure 1:
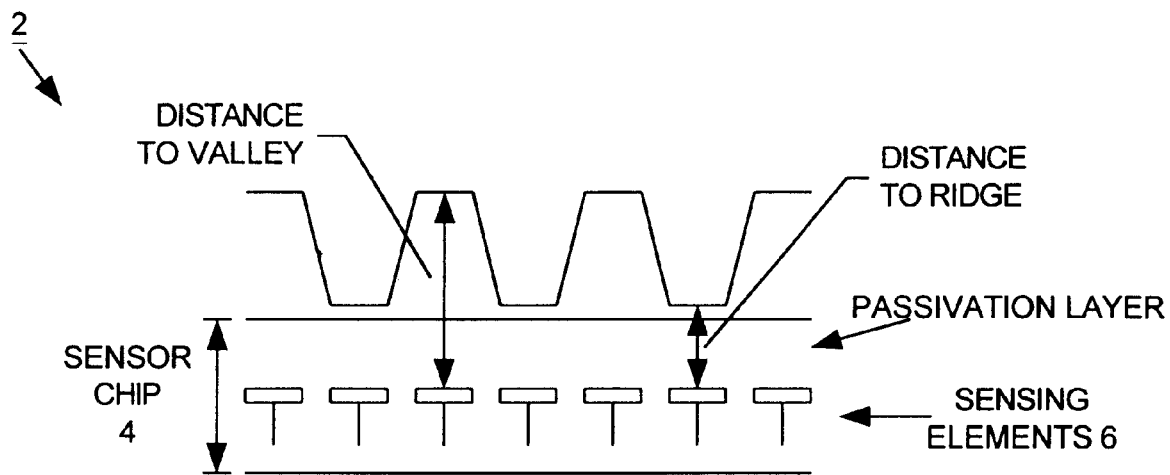
FIG. 1 depicts the operational theory behind a known biometric sensing device.
Figure 2:
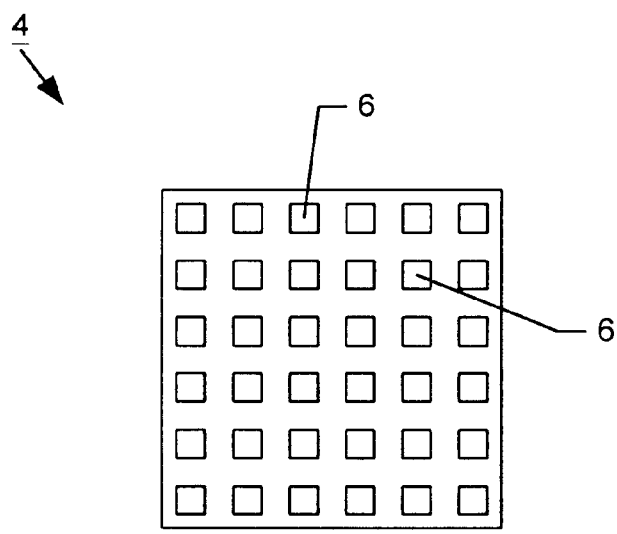
FIG. 2 depicts a known fingerprint sensor.
Figure 3:
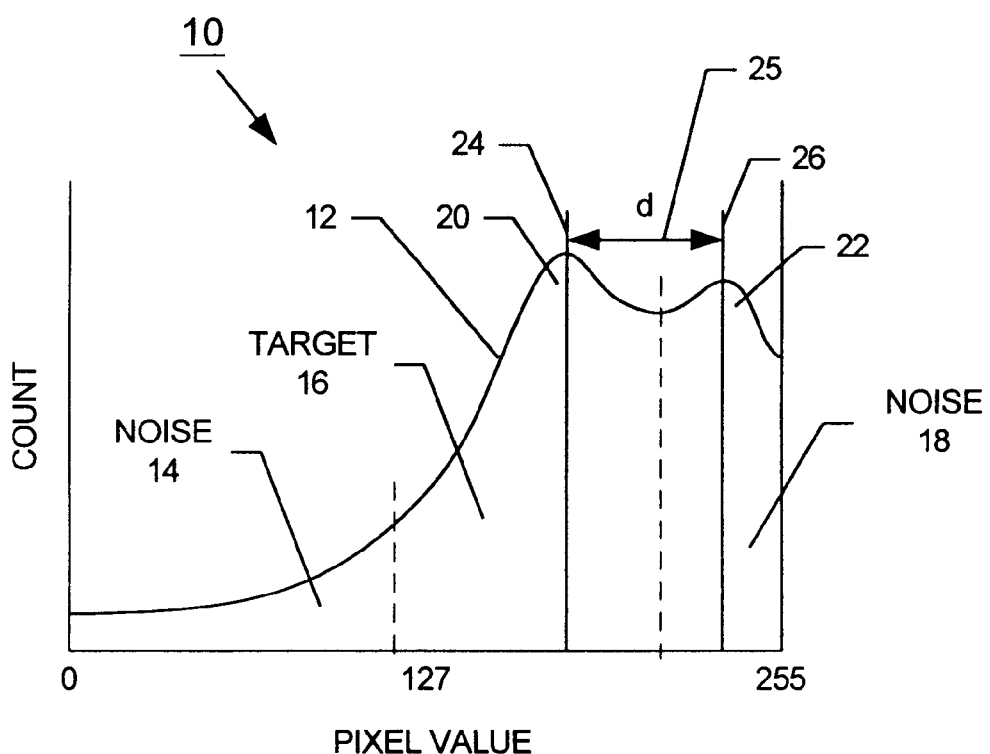
FIG. 3 is a histogram showing the distribution of certain pixel-values sensed by a biometric sensing device.

FIG. 3 is a histogram 10 showing the pixel values collected by a biometric sensor device. The figure will be used to explain how the automatic gain amplifier of the present invention operates. The histogram 10 plots the frequency (or "counts") of certain grayscale pixel values (or "pixel data") as sensed by a biometric sensor device. The x-axis has an 8-bit range of grayscale values: 0 representing black, 255 representing white, and shades of gray in between. The y-axis corresponds to the frequency of occurrence of the corresponding x-axis values.

The distribution curve 12 can be said to show three regions. The first region 14 represents noise, as does the third region 18. However, the second or "target" region 16 represents fingerprint minutiae information, such as the ridges and valleys of a fingerprint. Because fingerprints are often dry, there is a tendency for the ridges and valleys of the fingerprint to cluster near the white side of the histogram 10 when it is scanned by the biometric sensor device. The clustering tendency is illustrated by line 24, which slices through the peak 20 of the true fingerprint pixel data, and the line 26, which slices through the peak 22 of the white noise pixel data. Peaks 20 and 22 are initially separated by a distance (d) 25. The invention seeks to counteract this clustering tendency and thereby improve the clarity and resolution of the sensed biometric image.

Figure 4:
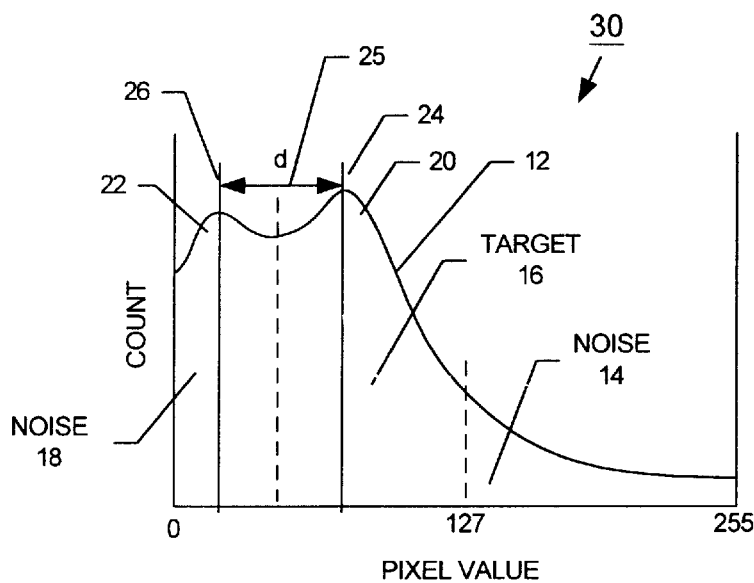
FIG. 4 shows a conceptual diagram of the distribution of certain pixel values as inverted according to an embodiment of the invention.
Figure 5:
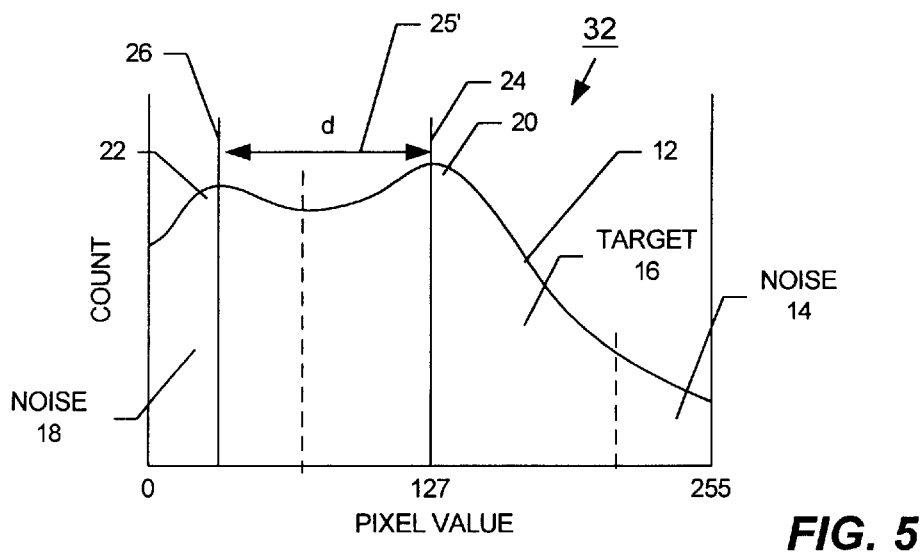
FIG. 5 shows a conceptual diagram of the distribution of certain pixel values after having adjusted a gain of the biometric sensing device according to an embodiment of the invention.
Figure 6:
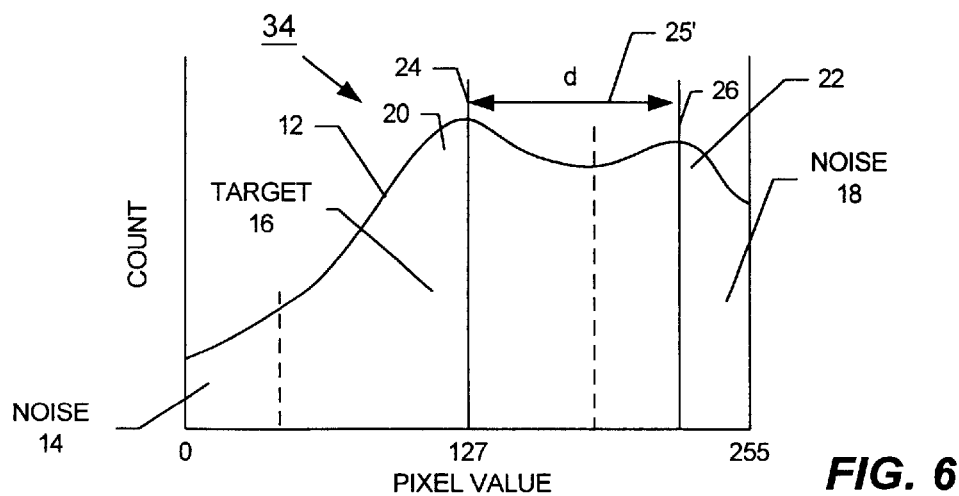
FIG. 6 shows the desired distribution of certain pixel-values after having adjusted the gain of the biometric sensing device according to an embodiment of the invention.

To this end, an automatic gain amplifier is disclosed that separates the first peak 20 and the second peak 22 by iteratively adjusting the gain of an amplifier that adjusts the sensitivity of the biometric sensor device. FIGS. 4–6 are diagrammatic representations of the gain adjustment process that is described in further detail with reference to FIG. 8 (below)

Turning to FIG. 4, the histogram 10 is first inverted to histogram 30. Inverting the histogram 10 places the second peak 22 before the first peak 20 and the noise region 14 at the trailing end of the histogram 30.

Next, as is shown FIG. 5, the gain of the operational amplifier is adjusted to yield histogram 32. Adjusting the gain of the operational amplifier causes peaks 22 and 20 to separate by a distance 25'. Because the histogram 10 was inverted, the pixel values for the target region 16 are greater than the pixel values for the noise region 18. Thus, amplifying the pixel values will have the affect of spreading the lower value regions less than the upper value regions. Thus, the resolution of the target region 16 is increased more than the corresponding resolution of the noise region 18. Moreover, the noise region 14 will amplify out of range of the grayscale value—effectively filtering it from consideration.

Now, FIGS. 4 and 5 were conceptual diagrams. Histograms 30 and 32 were actually not generated by the electronics circuitry per se, but rather through software manipulation of the fingerprint pixel data sensed by the biometric sensor device. The histograms 30 and 32 are used for the purpose of explaining the automatic adjustment process, which, according to one embodiment, is performed by a microprocessor and corresponding control software. FIG. 6, however, shows the modified histogram 34 (histogram 32 inverted) resultant from the automatic gain amplification processes described above (and in further detail below). Notice the separation of the peaks 20 and 22. Moreover, notice that the distribution area of the target region 16 is elongated—meaning that a higher resolution and improved biometric minutiae information clarity is achieved.

Figure 7:
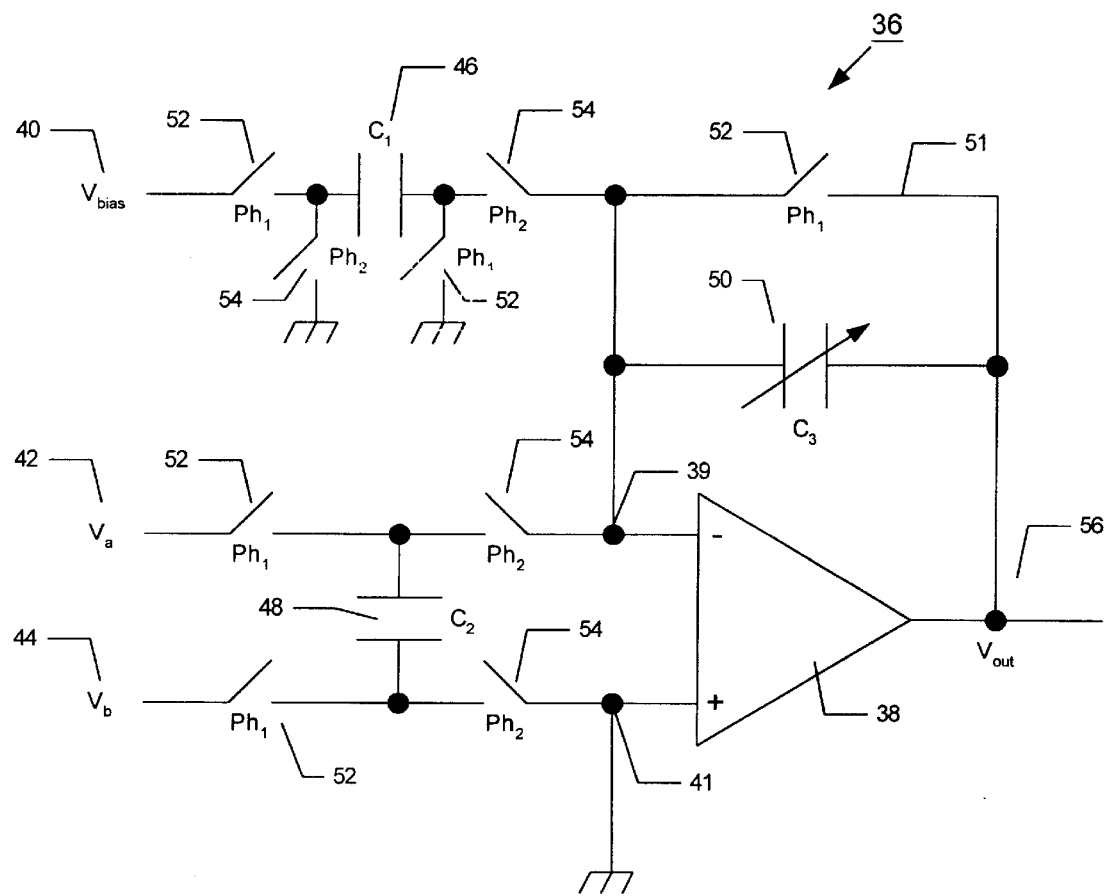
FIG. 7 is an electrical schematic of the automatic gain amplifier according to an embodiment of the invention.

FIG. 7 shows electronic circuitry that comprises a significant portion of an embodiment of the automatic gain amplifier 36 according to one embodiment of the invention. Bias voltage ($V_{bias}$) 40, sample voltage ($V_a$) 42, and sample voltage ($V_b$) 44 are fed into the operational amplifier 38. The voltage inputs are not always coupled to the operational amplifier 38. Instead a series of intervening switches 52 and 54, under control of opposite edges of a clock cycle (not shown), dictate whether the voltage inputs are coupled and also determine whether any intervening capacitors are charging or discharging. According to one embodiment, the sample voltages 42 and 44 represent the charge at a sensing element in a capacitive sensor chip at two separate time intervals.

A first capacitor ($C_1$) 46 is connected in series with bias voltage 40 and the negative input 39 of the operational amplifier 38. A second capacitor ($C_2$) is connected between the sample voltage 42 and sample voltage 44, and through switches 54 to the positive input 41 and negative input 39. A third, variable capacitor ($C_3$) 50, under control of a microprocessor executing software code or hard-wired logic circuitry, is connected between the negative input 39 and the output 56 of the operational amplifier 38. A second feedback line 51, under control of switch 52, is also connected between the negative input 39 and the output 56.

The voltage output 56 of the automatic gain amplifier 36 is represented by EQ. 1.

$$V_{out} = \frac{C_1 \cdot V_{bias} + C_2(V_b - V_a)}{C_3} \quad (1)$$

Selecting a value C for the first capacitor 46 and second capacitor 48 yields a gain for the automatic gain amplifier 36 that is inversely proportional to the variable capacitor 50 (that is, $G_m = C/C_3$).

According to one embodiment, an 8-bit analog-to-digital converter is coupled to the voltage output 56. The 8-bit analog-to-digital converter converts the analog voltage output 56 into a value that can be used by a microprocessor as an input to a software control algorithm. Alternatively, the conversion can take place at the microprocessor.

Figure 8:
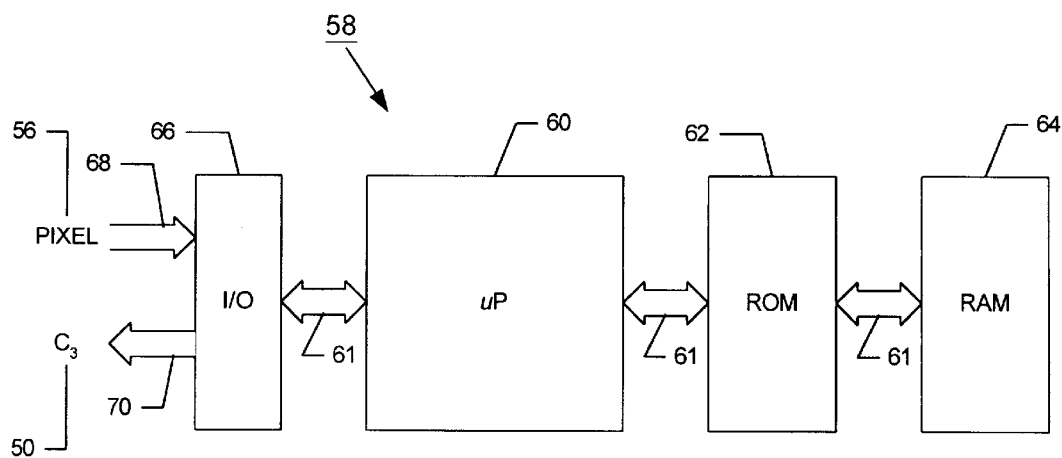
FIG. 8 is a block diagram of a microprocessor that can programmatically modify the gain of the automatic gain amplifier according to an embodiment of the invention.

FIG. 8 depicts a microcontroller 58 that controls the variable capacitor 50. The microcontroller includes a microprocessor 60, a persistent memory 62, and a volatile memory 64, each connected through a common bus 61 to the microprocessor 60. The microcontroller 58 further includes an input/output interface 66. Fingerprint pixel data 56 is input through input line 68, for example from voltage output 56, into the microprocessor 60. The microprocessor 60 stores the values in volatile memory 64 (or in an internal microprocessor memory) and executes software code, stored in persistent memory 62, to manipulate and analyze the fingerprint pixel data 56. The result is an output signal 70 that is used to control the variable capacitor 50. The output signal 70 can be an analog or digital signal, so an intervening digital-to-analog converter may be employed.

Figure 9:
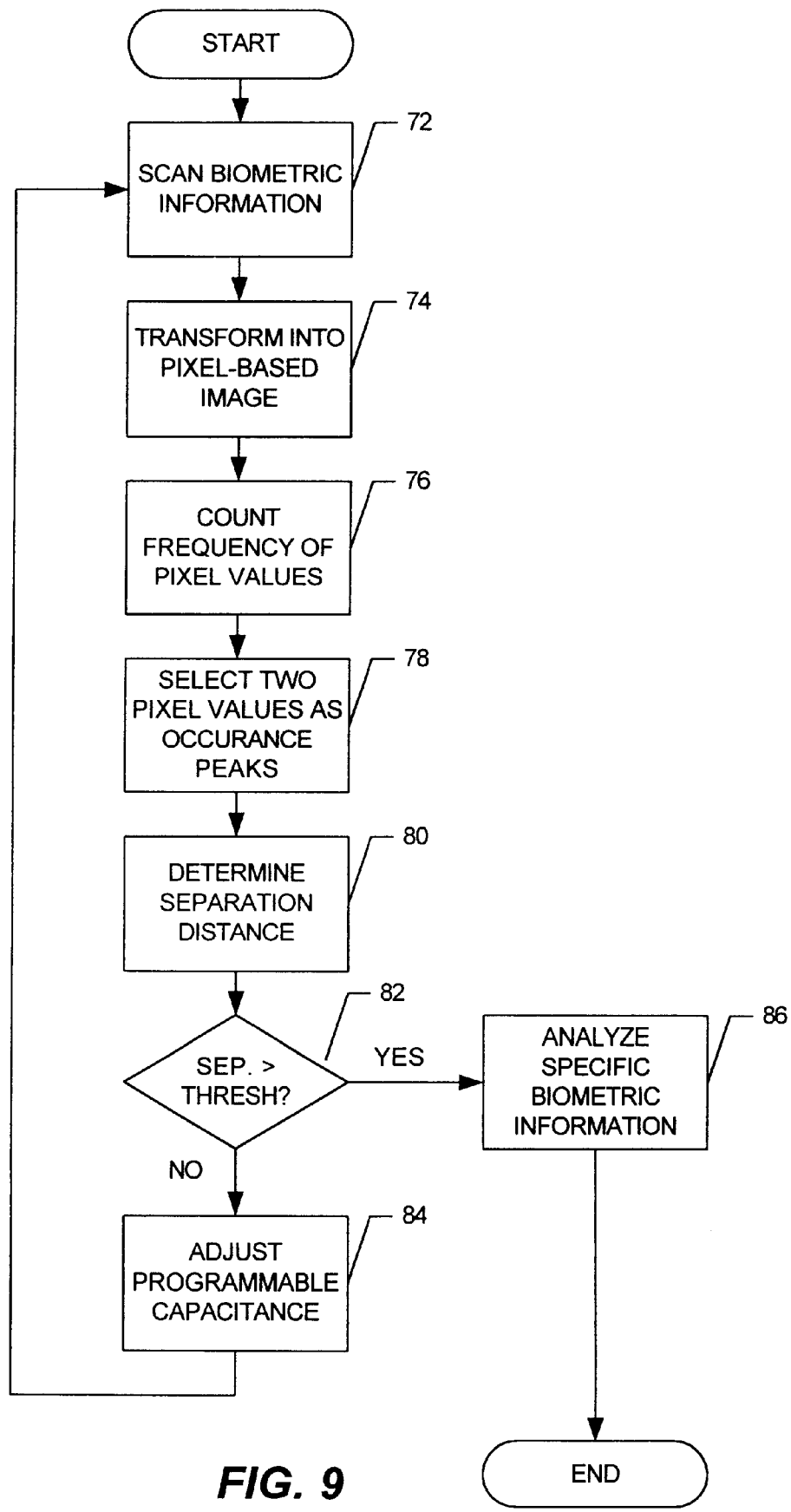
FIG. 9 is a flowchart depicting the steps performed according to an embodiment of the invention.

FIG. 9 is a flowchart depicting the steps performed by the microcontroller 58 as it manipulates and analyzes the pixel data input to control the variable capacitor 50. According to one embodiment, many of the steps are implemented in executable object code or another computer readable medium that is used to cause a microprocessor to perform the sequences of steps. For example, if the microcontroller 58 is utilized, the executable software code can be stored in persistent memory 62 and run from an execution memory area of the microprocessor 60.

In step 72, the biometric sensor device scans biometric information from, for example, a finger. The biometric image sensor device can be a capacitive fingerprint sensor or an optical fingerprint sensor. A presently preferred biometric image sensing device that can generate the pixel-values is the capacitive fingerprint sensing device disclosed in U.S. Pat. Nos. 6,016,355 and 6,049,620, which are incorporated herein by reference in their entirety. The capacitive fingerprint sensing device can also include a finger sensing element that enables the biometric sensor device, such as the device described in co-pending U.S. patent application Ser. No. 09/561,174, filed Apr. 27, 2002, entitled "METHOD AND APPARATUS FOR DETECTING THE PRESENCE OF A FINGER ON A BIOMETRIC SENSING DEVICE", which is also incorporated herein by reference in its entirety.

In step 74, the biometric information is transformed into pixel-based image data, for example a grayscale value. In step 76, the frequency of the pixel values are counted, thus creating the histogram described above with references to FIG. 3. In step 78, two pixel values are selected as occurrence peaks, meaning they represent the peaks 20 and 22 described above. The selection of the occurrence peaks 20 and 22 effectively divides the histogram into the three regions. In step 80, the separation between the peaks is determined, and in step 82 the separation value is compared against a threshold separation value (or values).

According to experiments by the inventors, acceptable separation values, when using 8-bit pixel values, are between 30 and 128 pixel values. In practice, a separation value of approximately 128 is ideal when 8-bit grayscale values store the pixel data.

If the separation value is below the threshold separation value, then the capacitance of the variable capacitor 50 is adjusted in step 84. For instance, if the target region 16 and the noise region 18 are still too close, then the gain is increased, but if they are too far, then the gain is decreased.

According to one embodiment, an iterative successive approximations technique is used in step 84 whereby the capacitance adjustments are either halved or doubled depending on how the pixel data responds to the amplification. Assume, for example, that variable capacitance 50 corresponds to an 8-bit value. If the separation distance is too close, then the gain is increased by 128 units. If, upon the next pass through steps 72–82, the separation distance is too far, then the gain is decreased by 64 units. And, after the next pass through steps 72–82, if the separation distance is too close, then the gain is increased by 32 units, and so on until the ideal separation is achieved. According to other embodiments, a linear, a non-linear, a lookup-table based, or a fuzzy logic type control methodology can be implemented to adjust the output controlling the variable capacitance 50.

After step 82, if the separation value was within the threshold value (or values), then in step 86 the pixel values can then be further analyzed for specific biometric information, for instance fingerprint ridge end points or bifurcations. The specific biometric information can be used to enroll the particular biometric into a verification system, or it can be matched against enrolled biometric information stored in templates. Techniques for analyzing or matching the biometric information are disclosed in co-pending U.S. patent application Ser. Nos. 09/354,929, filed Jul. 15, 1999, and Ser. No. 09/501,355, filed Feb. 9, 2000, which are both incorporated herein by reference in their entirety.

Minor modifications to the invention are envisioned, but are not necessary for the proper operation of the automatic gain amplifier described herein. For instance, anti-spoofing technology may be employed either before or after adjusting the gain, such as the anti-spoofing technology described in U.S. Provisional Application Serial No. 60/158,458, filed Oct. 7, 1999, which is incorporated herein by reference in its entirety. Moreover, the histogram 10 may be filtered at either end of the pixel values before minutiae are extracted. Similarly, the collection of pixel values for selecting a sample set for the histogram 10, or indeed even adjusting the gain itself, may be performed on a row by row, column by column, or even sub-region basis on the biometric sensor device. Accordingly, the written description and drawings are to be interpreted in an illustrative rather than a restrictive sense and are to be limited only by the accompanying claims.

What is claimed is:

1. A method for implementing an automatic gain amplifier in a biometric sensing device, comprising:

sensing biometric information from said biometric sensing device;

transforming said sensed biometric information into a pixel-based image corresponding to said biometric information;

counting a frequency of occurrence of pixel-values in said pixel-based image;

selecting at least two of said counted frequency of occurrence of pixel-values as a first peak and a second peak;

determining a separation pixel-value between said first peak and said second peak; and adjusting a gain amplifier coupled to said biometric sensing device in an iterative manner until said second peak is not less than thirty separation pixel values from said first peak.

2. The method of claim 1, wherein said biometric sensing device comprises a capacitive fingerprint sensor.

3. The method of claim 2, wherein said capacitive fingerprint sensor comprises a finger sensing element configured to enable said biometric sensing device when a finger is present.

4. The method of claim 1, wherein said biometric sensing device utilizes an optical fingerprint sensor.

5. The method of claim 1, wherein adjustment of the automatic gain amplifier is performed by a microcontroller.

6. The method of claim 5, wherein the microcontroller has input comprising said pixel-values and an output comprising a signal that controls gain of said gain amplifier.

7. The method of claim 6, wherein said input to said microcontroller corresponds to a charge differential at a capacitive sensing element over a fixed period, and in response to said charge differential, performs said step of adjusting said gain of said gain amplifier.

8. The method of claim 7, wherein said charge differential is measured in a two phase process.

9. The method of claim 1, wherein said step of iteratively adjusting said gain amplifier is accomplished by adjusting a capacitance value of a variable capacitor within said gain amplifier.

10. The method of claim 9, wherein said step of adjusting said capacitance value of said variable capacitor is accomplished in a successive approximations manner.

11. The method of claim 9, wherein one or more steps of iteratively adjusting said gain amplifier are stored in object code in a persistent memory.

12. The method of claim 1, further comprising analyzing said pixel-values for specific biometric pattern information when said separation pixel-value is within a specified threshold.

13. An automatic gain amplifier for a biometric sensing device, said automatic gain amplifier comprising:

an operational amplifier having a negative input, a positive input and an output;

a bias voltage input coupled to said negative input through a first capacitor;

a first biometric voltage input coupled to said negative input;

a second biometric voltage input coupled to said positive input, said first biometric input voltage and said second biometric input voltage coupled through a second capacitor;

a programmable capacitance coupled between said negative input and said output, said programmable capacitance inversely proportional to a gain of said automatic gain amplifier; and a microcontroller communicatively coupled to said programmable capacitance, said microcontroller configured to iteratively adjust said programmable capacitance, said iterative adjustments dependent upon a separation pixel-value between a first peak and a second peak in a pixel-value frequency distribution generated from a plurality of biometric sensing elements in said biometric sensing device.

14. The automatic gain amplifier of claim 13, wherein said microcontroller comprises:

a microprocessor;

a persistent memory;

a volatile memory, each connected through a common bus to the microprocessor; and an input/output interface communicatively connected to said microcontroller, said input/output interface having an input and an output, said input configured to receive pixel data, said output configured to drive a signal used to adjust a capacitance of said programmable capacitance.

15. The automatic gain amplifier of claim 14, wherein said pixel data received through said input is stored in said volatile memory.

16. The automatic gain amplifier of claim 13, wherein said biometric sensing device comprises:

a sensor chip having an array of capacitive sensing elements;

a biometric contact surface disposed above said array of capacitive sensing elements; and a passivation layer disposed between said sensing elements and said biometric contact surface.

17. The automatic gain amplifier of claim 13, wherein adjusting said programmable capacitance increases clarity of a pixel-based image created from said plurality of biometric sensing elements.

18. A method for controlling image clarity in a biometric sensing device, comprising:

receiving biometric information from said biometric sensing device;

transforming said sensed biometric information into a pixel-based image comprised of pixel-values corresponding to said biometric information;

counting a frequency of occurrence of said pixel-values in said pixel-based image;

selecting at least two of said counted frequency of occurrence of said pixel-values as a first peak and a second peak;

determining a separation pixel-value between said first peak and said second peak;

inverting said pixel-values;

calculating an adjustment value based on said separation pixel-value; and adjusting a gain of said biometric sensing device corresponding to said adjustment value.

19. The method of claim 18, further comprising repeating claim 18 until said separation-pixel value is within a specified threshold.

20. The method of claim 19, further comprising analyzing said plurality of pixel-values for specific biometric pattern information when said separation pixel-value is within said specified threshold.

21. The method of claim 18, wherein said steps of reading biometric information from said biometric sensing device and transforming said sensed biometric information into a pixel-based image comprised of pixel-values comprises:

sampling a first charge at a capacitive plate;

discharging said capacitive plate for a fixed period of time;

sampling a second charge at said capacitive plate after said fixed period of time;

measuring a difference in charge between said first charge and said second charge; and transforming said difference in charge into one of said pixel-values.

* * * * *